(12) United States Patent
DeBien

(10) Patent No.: US 6,247,427 B1
(45) Date of Patent: Jun. 19, 2001

(54) QUICK RELEASE LEASH

(76) Inventor: Humberto DeBien, 9162 Whippoorwill Trail, Jupiter, FL (US) 34478

( * ) Notice: Subject to any disclaimer, the term of this patent is extended or adjusted under 35 U.S.C. 154(b) by 0 days.

(21) Appl. No.: 09/195,965

(22) Filed: Nov. 19, 1998

Related U.S. Application Data

(63) Continuation-in-part of application No. 08/958,111, filed on Oct. 27, 1997, now abandoned.

(51) Int. Cl.⁷ ..................................................... A01K 1/08
(52) U.S. Cl. ............................................................ 119/776
(58) Field of Search ................................. 119/792, 769, 119/772, 776, 865, 856, 796; 464/29; 403/327, 328, DIG. 1; 242/390.8, 396.7, 396.8, 402, 250

(56) References Cited

U.S. PATENT DOCUMENTS

| | | | |
|---|---|---|---|
| 1,533,619 | * 4/1925 | Thompson | 403/328 |
| 2,526,790 | * 10/1950 | Wroblewski | 403/326 |
| 2,612,139 | * 9/1952 | Collins | 119/865 |
| 3,099,250 | * 7/1963 | Soles | 119/776 |
| 3,540,089 | * 11/1970 | Franklin | 119/776 |
| 3,589,341 | * 6/1971 | Krebs | 119/865 |
| 3,693,484 | * 9/1972 | Sanderson, Jr. | 403/328 |
| 3,693,596 | * 9/1972 | Croce et al. | 119/796 |
| 3,776,198 | * 12/1973 | Gehrke | 119/794 |
| 3,937,418 | * 2/1976 | Critelli | 242/107.4 |
| 3,994,265 | * 11/1976 | Banks | 119/865 |
| 3,995,789 | * 12/1976 | Carle | 242/193 |
| 4,165,713 | * 8/1979 | Brawner et al. | 119/794 |
| 4,277,934 | * 7/1981 | Rieck | 403/328 |
| 4,328,767 | * 5/1982 | Peterson | 119/794 |
| 4,404,297 | * 9/1983 | Woutat | 119/776 |
| 4,404,714 | * 9/1983 | Duran | 403/328 |
| 4,541,364 | * 9/1985 | Contello | 119/772 |
| 4,621,589 | * 11/1986 | Thinnes | 119/770 |
| 5,103,771 | * 4/1992 | Lee | 119/776 |
| 5,401,034 | * 3/1995 | Mallinger | 473/576 |
| 5,595,143 | * 1/1997 | Alberti | 119/794 |
| 5,716,160 | * 2/1998 | Lee | 403/365 |
| 5,791,297 | * 8/1998 | Mudge | 119/865 |
| 5,887,550 | * 3/1999 | Levine et al. | 119/796 |
| 6,003,472 | * 12/1999 | Matt et al. | 119/796 |
| 6,041,571 | * 3/2000 | Fields et al. | 53/331.5 |

FOREIGN PATENT DOCUMENTS

2105389 * 4/1972 (FR) ................................... 119/776

* cited by examiner

Primary Examiner—Thomas Price
(74) Attorney, Agent, or Firm—Malloy & Malloy, P.A.

(57) ABSTRACT

A leash assembly designed to accomplish a quick release or detachment of an animal from its tethered position and/or a quick re-attachment into a tethered position, the assembly including an elongated lead having an elongated release cable or like structure axially movable along the length of the lead. A distal end of the release cable is connected to a rotating coupling assembly structured to removably connect a collar or like harness to the distal end of the lead. An activation assembly is connected adjacent to the proximal end of the lead and includes a hand manipulated activation member which when selectively positioned by the hand of the user of the subject assembly serves to position the release cable into a disconnect position relative to the coupling assembly.

29 Claims, 5 Drawing Sheets

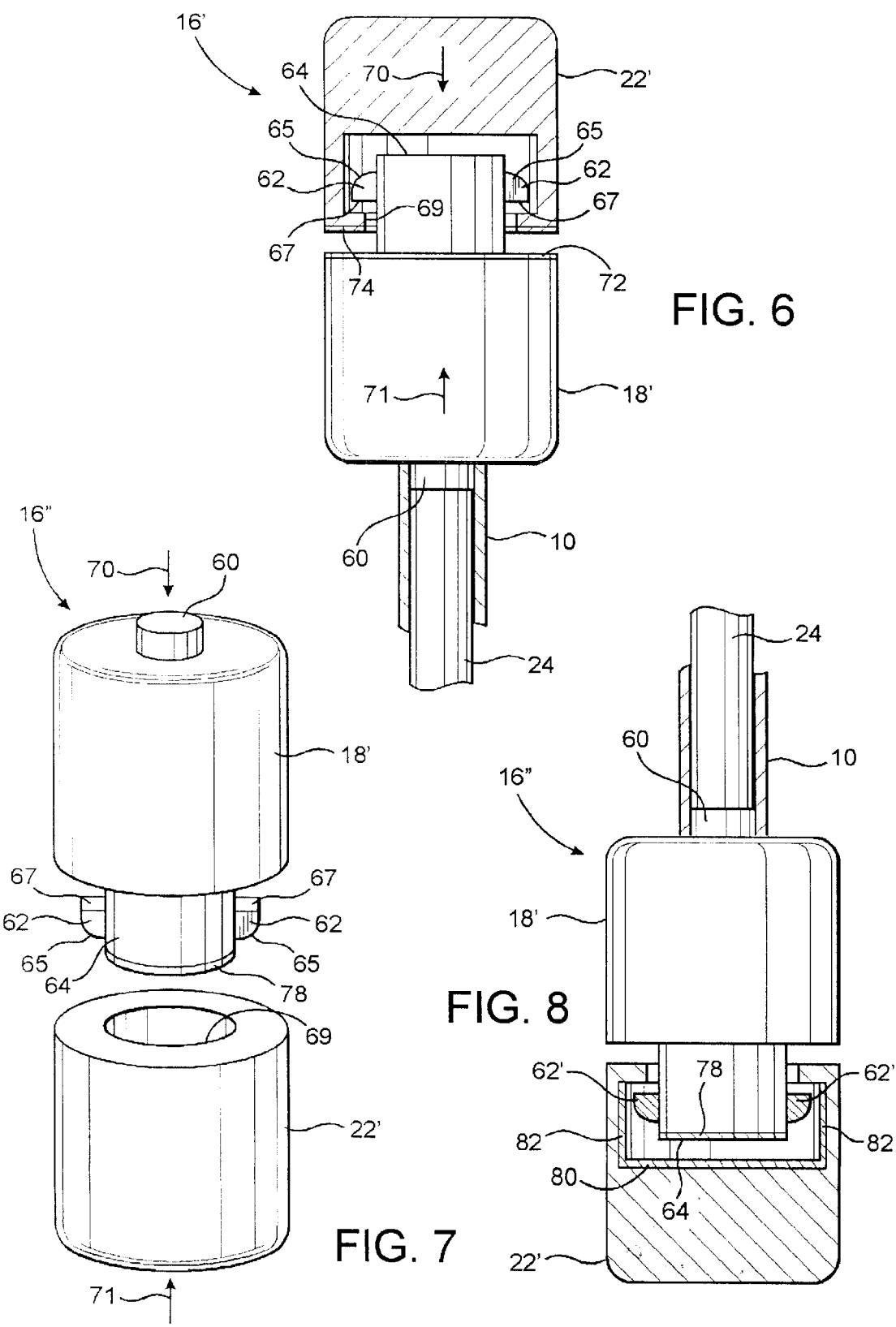

QUICK RELEASE LEASH

This is a continuation in part application of U.S. patent application Ser. No. 08/958,111 filed on Oct. 27, 1997, now abandoned.

BACKGROUND OF THE INVENTION

1. Field of the Invention

The present invention is directed to a leash assembly designed to quickly and efficiently attach an animal to and release an animal from an elongated lead normally used to restrain or control the animal when connected thereto.

2. Description of the Related Art

It is widely known that there are millions of dog owners in this country as well as other countries throughout the world. Dogs comprise one of the most popular types of animals for household pets. Of course, dogs are extremely popular animals for other than simple companionship. Other uses of dogs include working dogs and show dogs. In turn, working dogs may be classified as dogs utilized for police enforcement purposes, military activities, dogs trained for hunting and also dogs specifically trained to aid those individuals who are visually impaired.

Regardless of the above classifications, the care and maintenance of dogs require the use of numerous auxiliary or supplementary items. Among the most popular is the dog leash or tethering apparatus wherein dogs are retained and/or restricted for purposes of control when not contained by fences in a yard or like area. Moreover, similar type leash assemblies are also useful on a variety of different animals including pets and farm animals, such as horses.

It is also well recognized that leash structures, collars, harnesses, etc. are available in numerous and varying designs intended to control an animal for different purposes. Prior art structures exist which comprise leash and collar combinations specifically structured such that the length of a lead of the leash assembly is selectively variable so that the dog or animal being tethered may enjoy a greater range of movement and freedom when the surrounding area allows. Alternately, the tethered animal may be better controlled, by shortening the length of the extendable lead in areas which do not allow the free roaming of the dog. Other prior art leash or tethering assemblies are specifically designed to allow control and retention of the dog or other animal while significantly reducing or eliminating the tangling of the dog in the retaining harness and/or about an anchoring structure to which the animal is tethered.

One area not specifically addressed by prior or related art leash and retaining harness assemblies, however, is the ability to quickly and effectively provide for both the quick connection and disconnection of an animal to and from the leash assembly. In the majority of conventional or known leash assemblies, it is necessary for a handler to manipulate a coupling structure utilizing both hands, wherein the coupling structure serves to connect the distal end of the lead to the collar or retaining harness mounted on the animal. This generally involves direct handling or manipulation of any one of a large variety of such coupling structures. Attachment of the animal can be extremely difficult, particularly when the dog or animal being tethered is overly frisky or otherwise in an excited state. Also, in accomplishing either attachment or detachment of the lead from the collar or like harness particular problems are encountered by the elderly or by those who are visually or otherwise physically challenged. In addition to the above, the handling of larger animals, such as horses and/or working dogs of the type trained to conduct police enforcement and/or military activities, requires that the animal be kept under control by the handler. However, in cases of emergency, it is equally important that the animal be released or detached from his controlling lead as quickly as possible as it could be dangerous for the animal to begin running while dragging the lead or any part of the leash assembly. Conversely, if the animal is loose, it may be necessary to quickly re-harness the animal in order to restrain its movement in a hazardous situation.

Accordingly, there is a recognized need in this area for a leash or tethering assembly which is specifically structured to accomplish a quick and efficient attachment or detachment of the animal, as well as quick and effective restraint of the animal. Such release should not require the direct manipulation of a coupling connector which serves to attach the distal end of a lead to the collar or harness mounted on the animal. Further, such a preferred leash assembly should be structured such that a quick and effective detachment or release of the animal can be accomplished through a manipulation of release or activating structures located a spaced distance from the animal and from the actual rotating coupling member serving to connect the animal harness to the lead.

As set forth above, retractable leash and/or tethering devices for dogs and other animals are of course known. However, in order to maintain even greater control of the animal being tethered, it is desirable to combine certain advantages of a retractable lead with structure capable of accomplishing a quick and efficient detachment of the distal or free end of the lead from the collar or harness mounted on the animal. Retractable leash assemblies of the type commercially available are typically spring biased to the extent that a release mechanism allows a free extension of the lead structure as the tethered animal travels a greater distance from the handler. However, in these known devices, the elongated lead cannot normally be retracted or rewound without the handler first providing slack in the lead by following or chasing the animal and thereby shortening the distance between the handler and the animal prior to rewinding the elongated lead for storage.

Another problem existing with conventional leash assemblies is the ability to efficiently and quickly accomplish attachment of the free end of the lead to the harness. Typically, known devices include a variety of snap on couplings requiring the use of both hands of the handler to attach the lead to the harness. This presents a distinct problem particularly when the animal is excited to the extent of requiring the animal as well as the harness to be firmly gripped or held in order to maintain control of the animal during the attachment of the lead to the harness. Therefore, there is a need for a preferred coupling assembly capable of accomplishing a quick and efficient attachment of the lead to the collar or harness while requiring only a single hand of a user thereof.

SUMMARY OF THE INVENTION

The present invention relates to a leash assembly designed to allow control of a dog or other animal by a handler and which is structured to accomplish a quick detachment of the animal from a remote position without requiring the direct handling or manipulation of the coupling member serving to interconnect the collar or like harness to the distal end of the lead. The present invention is also designed and structured to provide a quick and efficient attachment of an elongated lead to a collar or harness utilizing only a single hand of the user or handler.

More specifically, the present invention comprises an elongated flexible material lead being of any appropriate or preferred length and terminating at a distal end and an oppositely disposed proximal end. A preferably rotating coupling assembly is connected, at least in part, to the distal end of the lead and is specifically structured to accomplish a quick and easy attachment of the lead to the harness, as well as a quick release or detachment of the lead from a collar or harness mounted directly on the animal being tethered. In order to accomplish such quick detachment of the coupling assembly, the present invention further comprises an elongated release structure preferably in the form of a release or positioning cable formed of metallic or other applicable material having sufficient structural integrity to be movable axially along its own length and exert an axially directed force on a coupling assembly to be described in greater detail hereinafter. The term "structural integrity" refers to the structural features of the release cable being of a material with sufficient rigidity, while still being flexible, to exert the aforementioned axially directed force on the coupling assembly or be otherwise structured to be axially moveable along the length of the elongated lead so as to exert the aforementioned force on the coupling assembly and thereby orient the coupling assembly in a disconnect position, as will be explained in greater detailed hereinafter.

The release structure or cable is mounted on and preferably within the interior of the elongated lead structure and extends along the length thereof between the aforementioned distal end and proximal end. One end of the release cable disposed adjacent the distal end of the lead, is connected directly to the preferably rotating coupling assembly. Selective axial movement of the release cable causes a disconnection of the coupling components defining the subject coupling assembly. The aforementioned quick release is thereby accomplished from a location remote from the animal without the necessity of directly handling or manipulating the coupling assembly.

To accomplish the desired quick release, the present invention also includes an activation assembly mounted adjacent the proximal end of the elongated lead structure and including an activation member connected directly to the correspondingly positioned end of the positioning cable. Depending upon the various embodiments, to be described in greater detail hereinafter, the activation member may be disposed and configured for direct manipulation by a thumb or finger of a single hand of a person gripping a handle portion of the activation assembly which is connected to the proximal end of the lead. By depressing or otherwise manipulating the activation member, the release cable is forced to move axially along its length relative to the elongated lead on which it is mounted. This movement will cause an axially directed force to be exerted directly on at least one of the coupling components of the coupling assembly and a disconnection of the coupling assembly. A quick release and/or detachment of the collar or animal bearing harness will thereby be effected.

An additional embodiment of the present invention includes the coupling assembly structured to provide a quick attachment and detachment of the distal, free end of the lead structure to the collar or harness mounted on the animal. In addition, an equivalently structured coupling assembly may be used to connect opposite free ends of the collar to one another or otherwise be disposed to mount a different type of harness on the animal in an intended fashion. In the aforementioned coupling assembly, a first and second component is structured so as to be attached to one another in a manner which only requires a single hand of the handler or user of the leash assembly of the present invention. Quick and easy detachment of the two components of the coupling assembly is accomplished by manipulation of the activation assembly and movement of the leash structure mounted within the elongated lead, as set forth above. More specifically, each of the components of the present invention may be positioned into a predetermined aligned engagement with one another such that a pushing force exerted on the first and second components of the coupling assembly will cause a quick and efficient attachment of the two components to one another. Such quick attachment can be accomplished without manipulation of a spring biased plunger normally associated with generally known, swivel type coupling assemblies. Further, an alignment structure is mounted on each of the first and second components and is disposed and structured to facilitate the aforementioned predetermined aligned engagement of the components with one another. The alignment structure for each component preferably comprises magnetic surfaces cooperatively disposed in engageable relation with one another when the components of the coupling assembly are attached to one another.

Another feature of one preferred embodiment of the leash assembly of the present invention further includes an activation assembly comprising a drive motor to be actuated by a user. The drive motor is configured, such as by attachment to take up or storage spool, to effectuate a release of the quick release mechanism and/or a storage of the lead itself.

It is an object of the present invention to provide a leash assembly which is strong and secure, yet which also provides for the quick and easy release of the animal restrained thereby.

A further object of the present invention is to provide a leash assembly which is substantially easy to operate and does not require direct user manipulation of a coupling assembly when connecting the harness mounted on the animal to an elongated lead structure associated with the leash assembly.

It is also an important object of the present invention to provide a leash assembly structured to facilitate rapid and efficient attachment of a collar or like harness, mounted on the animal, to an elongated lead structure in a manner which requires minimal manipulation and the use of only one hand of the animal handler.

Yet another object to the present invention is to provide a leash assembly including an elongated lead which may be retracted or extended in a controlled manner whether or not the free end of the lead structure is secured to the animal harness.

It is also an important object to the present invention to provide the leash assembly, including the various operative components associated therewith, which is formed from a light weight yet durable material so as to be operable over an extended period and which is structurally designed to be produced or manufactured relatively inexpensively so as to make the present invention available to a wide range of potential customers.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 6 is a detailed view in partial cut away and section showing structural details of one preferred embodiment of the coupling assembly of the present invention.

FIG. 7 is a perspective view in partially exploded form of another preferred embodiment of the coupling assembly associated with the present invention.

FIG. 8 is a front plan view of the embodiment of FIG. 7 in a connected position.

Like reference numerals refer to like parts throughout the several views of the drawings.

DETAILED DESCRIPTION OF THE PREFERRED EMBODIMENT

Figure 1:
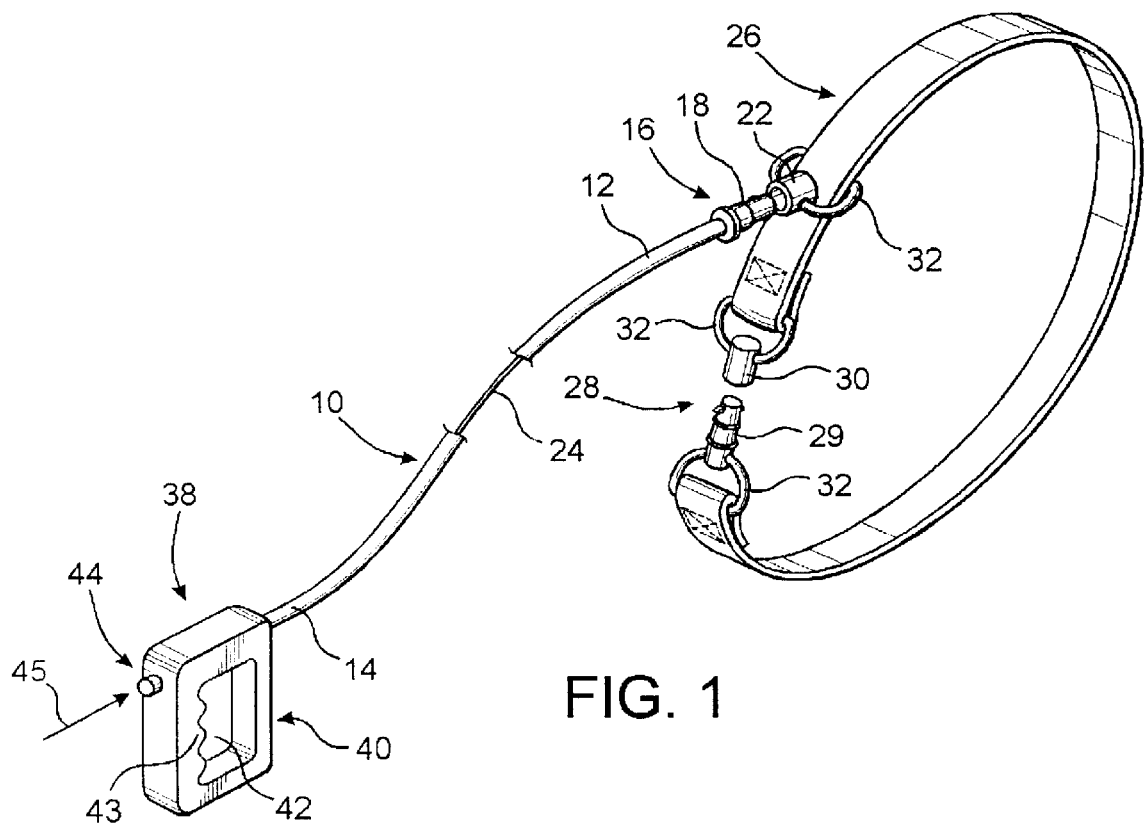
FIG. 1 is a perspective view in partial cutaway showing the various structural features of one preferred embodiment of the present invention.

As shown in the accompanying Figures, the present invention is directed towards a leash assembly wherein a preferred embodiment is disclosed in FIG. 1 and includes an elongated lead structure 10 being of any applicable or desired length and further being formed of a flexible material so as to facilitate freedom of movement of both the animal and the handler or user of the subject assembly.

The elongated lead structure 10 terminates at a distal end 12 and a proximal end 14, which are oppositely disposed relative to one another. Moreover, a coupling assembly, generally indicated as 16, is secured, at least in part, adjacent the distal end 12 of the lead structure 10 and includes a first component as 18 and a second component 22. The first component 18 is secured to the distal end 12 of the lead structure 10 and is directly connected to a release structure which may be defined by an elongated release or positioning cable 24. With further reference to the coupling assembly 16, the second coupling component 22 is mounted on or attached to a collar as at 26 or like harness designed to be mounted directly on the animal's body in the conventional fashion. Opposite ends of the collar or harness 26 may define connectable portions and if desired may be removably attached using a substantially equivalent coupling assembly generally indicated as 28 similar in operation to the coupling assembly 16 associated with the lead 10. Moreover, the harness 26 itself may be integrated as part of the present invention wherein the coupling assembly 28 incorporates specific structural improvements set forth in greater detail hereinafter with reference to FIGS. 5 through 8 which provides a quick and efficient attachment or coupling of opposite ends of the collar or harness 26. The coupling assembly 28 of the present invention also includes a first component 29 and a second component 30 designed to be removably and quickly attached and detached relative to one another so as to secure the collar 26 about the neck of the dog or other animal being tethered. Loop type connecting elements as at 32 may serve to movably mount or attach the components 29, 30 of the connecting assembly 28 to the opposite ends of the collar 26.

A loop type connector 32 may serve to movably mount the second component 22 of the coupling assembly 16 to the collar 26 such that the entire coupling assembly 16 is allowed to move freely along the length of the collar in order to provide the animal more freedom when connected to the lead structure 10 and also to reduce the possibility of tangling of the collar 26 with the remainder of the lead structure 10.

Figure 2:
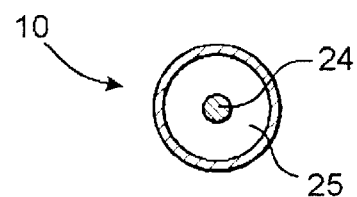
FIG. 2 is a sectional view of FIG. 1.
Figure 2A:
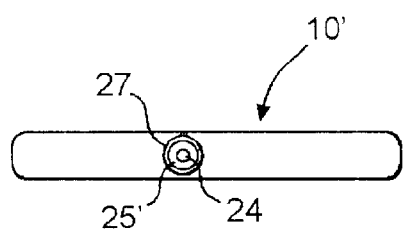
FIG. 2A is a sectional view of the lead of FIG. 4.

With reference to the embodiment of FIGS. 1 and 2, the elongated release structure preferably in the form of release cable 24, is preferably mounted within a hollow interior 25 of an outer flexible material, elongated lead structure 10, as illustrated in FIG. 2. The lead structure 10 may therefore assume a generally tubular configuration so as to enclose the release cable 24 in a hollow interior 25 thereof. Alternatively, as illustrated in FIG. 2A, a separate hollow sheath structure 27 may be provided and preferably secured to or, embedded or concealed within the lead structure 10'. The sheath structure includes a hollow interior 25' and preferably extends along the entire length of the lead structure 10' so as to enclose the release cable 24 therein along its entire length. Such a configuration is particularly beneficial in woven material lead structures, or if the lead structure is to be wound, but movement of the release cable 24 while in an at least partially wound position is required. In this embodiment, the sheath structure 27 is configured to facilitate the sliding movement of the release cable 24 relative to the lead structure 10'.

Figure 4:
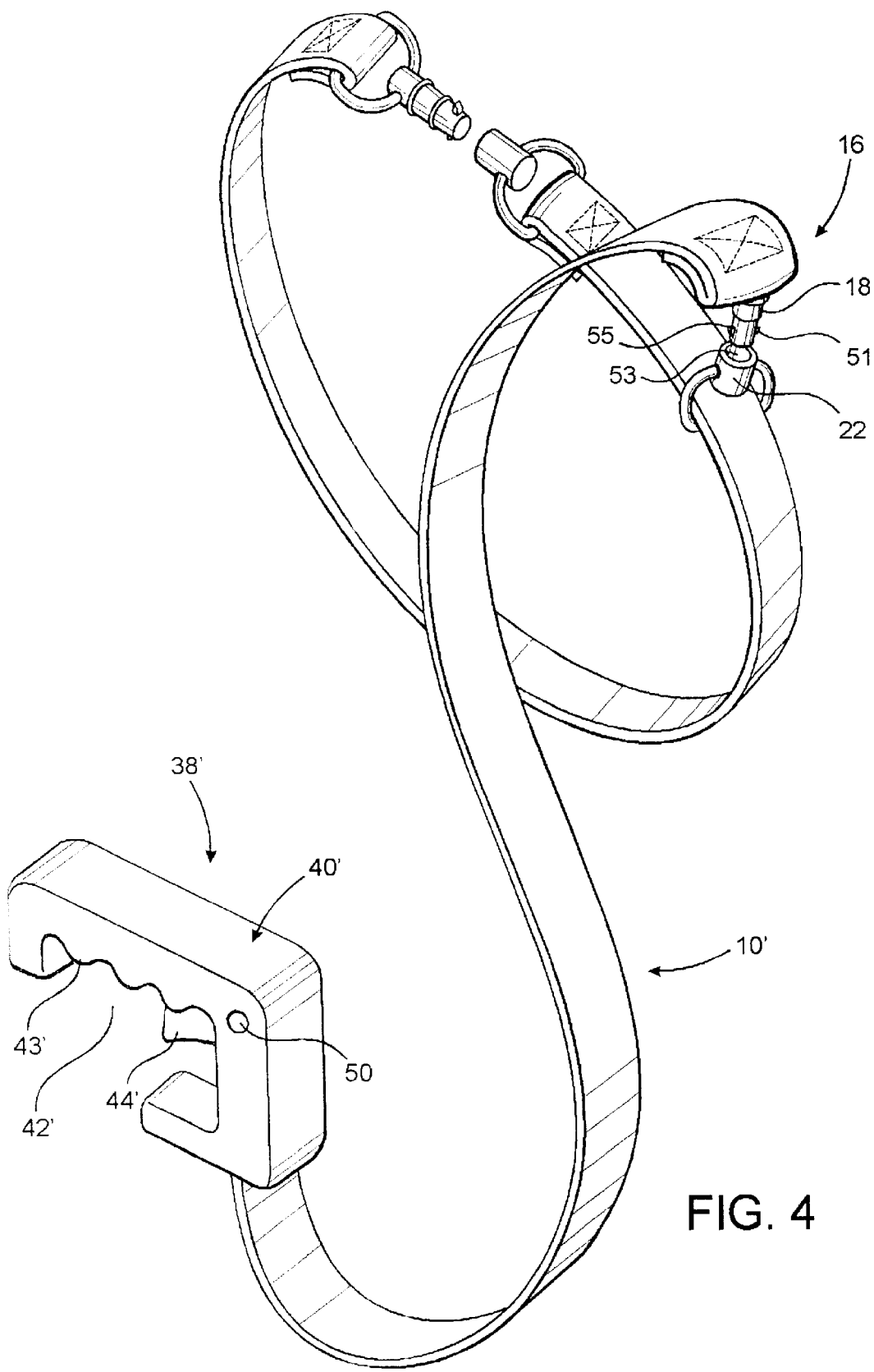
FIG. 4 is a perspective view showing yet another preferred embodiment of the present invention.
Figure 5:
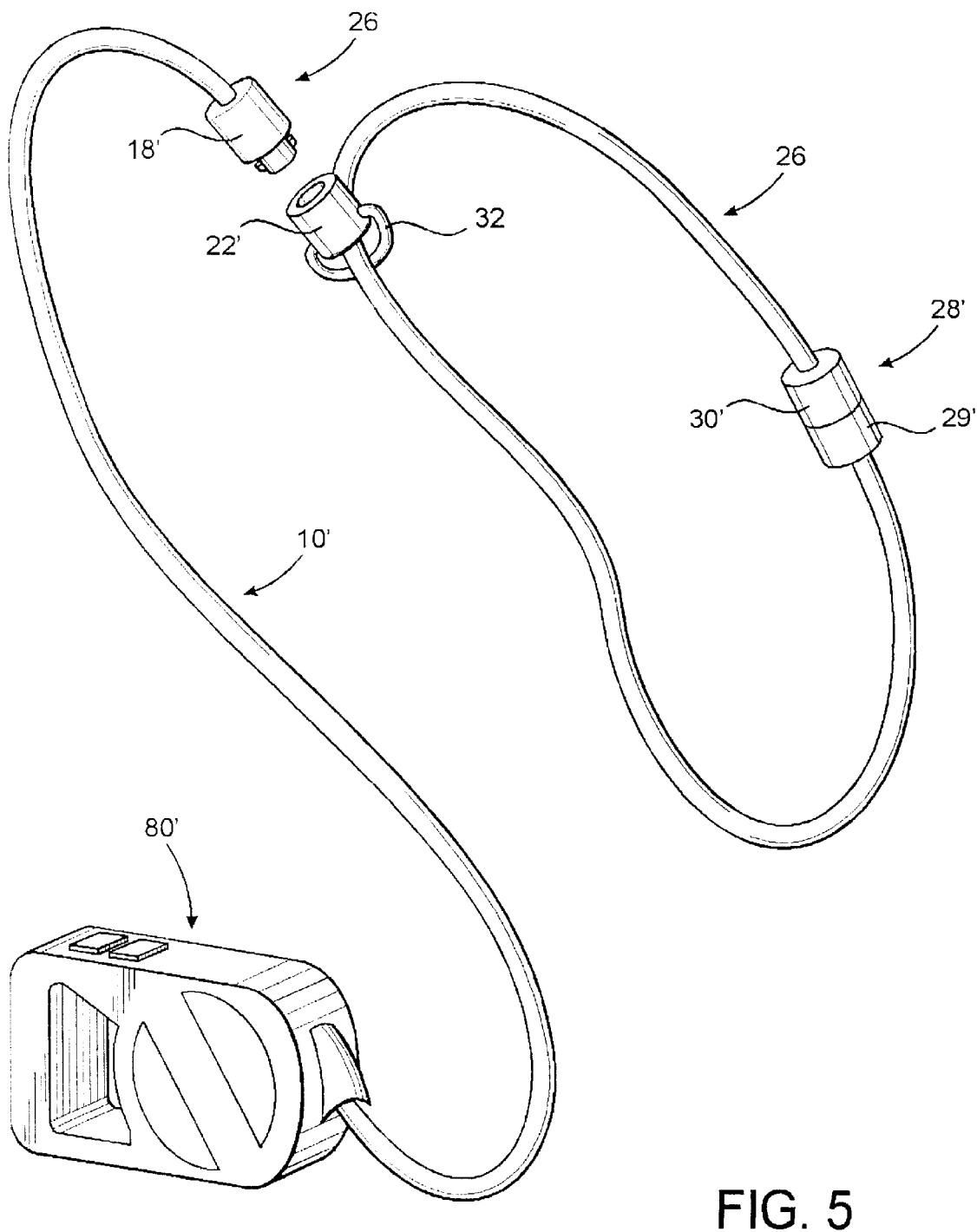
FIG. 5 is a perspective view of another, preferred embodiment of the present invention.

As set forth above, the coupling assemblies 16 and/or 28 may be equivalently structured and as also set forth above additional, more preferred embodiments of the coupling assemblies 16 and 28 are shown in detail in FIGS. 6,7 and 8. With reference to FIG. 5 the coupling assembly incorporating the structural features of either of the embodiments of FIGS. 6 or 7,8 are represented as 16' and 28' respectively. With further reference to FIG. 4, the coupling 16 and 28 include a spring biased plunger 51, which when axially disposed inwardly into the housing 53 will serve to release outwardly extending, oppositely disposed fingers 55 from their extended outer most position. This will allow detachment of the male coupling member 18 from the female coupling member 22. For purposes of clarity the structural details of the preferred embodiments of FIG. 6 and FIGS. 7 and 8 are explained with reference to coupling assembly 16' and 16" as indicated in the aforementioned Figures. It is again to be emphasized that the structural components of the coupling assembly 16' and 28' may be identical. An important feature of both the different embodiments of FIGS. 6 and 7, 8 is the ability to accomplish a quick and efficient attachment and detachment of the components of the respective coupling assemblies, such as while utilizing only a single hand of the user or animal handler. Further, attachment can be accomplish without the physical depression or other manipulation of a spring biased plunger or other release structure.

More specifically, an important feature of the embodiment of the coupling assembly 16' of FIG. 6 as well as the additional preferred embodiment 16" of FIGS. 7 and 8 is the inclusion of one or preferably two locking fingers 62 having an outer surface specifically configured to facilitate the quick and efficient attachment and detachment of the first component 18' to the second component 22'. In particular, each of the locking fingers 62 includes a leading surface segment 65 and a trailing surface segment 67. The locking fingers 62 are normally biased outwardly into the locking position shown in FIG. 6. Furthermore, the trailing surface segments 67 of each of the locking fingers 62 are configured into a transverse, linear shape so as define a stop member which will prevent inadvertent detachment of the first and second component 18' and 22' from one another such as when these components are inadvertently pulled apart due to a strain of the animal on the lead 10. As such, it is necessary to forcefully dispose the locking fingers 62 inwardly into the interior of the first component 18' in order to define a retracted orientation and allow passage of the leading end 64 of the component 18' out through the receiving aperture as at 69 formed in the second component 22'.

Looking in greater detail, the coupling assembly 16' comprises a first component 18' and a second component 22' which, as shown are respectively configured to define a male coupling component and a female coupling component. At least one, preferably the male coupling component is preferably structured to rotate or swivel, thereby allowing the coupling assembly itself to be rotatable and swivel to prevent tangling and the like. As explained above, the first component 18' is connected to the distal or free end of the lead 10 and more specifically in direct operative attachment to the interior, axially moveable release structure in the form of the release cable 24. The release cable 24 is connected directly to a plunger 60 so as to exert an axially directed force thereon which in turn accomplishes release of the first component 181 from the second component 22' by virtue of the fact that an axially directed pulling force will cause the plunger 60 to move outwardly against a force exerted thereon by a biasing spring (not shown). This outward movement of the plunger 60 will in turn cause outwardly extending locking fingers 62 to be pulled into the retracted orientation and released from a normally outwardly biased position, therefore allowing the first component 18' to be easily released from the second component 22'.

Also as indicated, a further important feature of the present invention is its ability to achieve easy and effective engagement or attachment between the first component 18' and the second component 22'. This facilitated engagement is preferably facilitated by virtue of the fact that the leading surface segment 65 of each of the locking fingers 62 has a substantially convergent configuration which extends outwardly in either a curvilinear or slanted shape. Accordingly, engagement of the leading surface segment 65 with the perimeters of the receiving aperture 69 will cause a sliding engagement of the respective locking fingers 62 relative to the periphery of the receiving aperture 69 and thereby cause a forced, inward retraction of the locking fingers 62 to counter the normal outward bias. The leading end 64 of the first component 18' will thereby be allowed to pass through the aperture 69 into the connected and locked position as shown in FIG. 6 in a substantially facilitated manner.

In order to accomplish such quick and efficient attachment of the components 18' and 22' together into the locked position of FIG. 6, the first and second components 18' and 22' should be disposed in predetermined aligned engagement with one another. Such predetermined aligned engagement may be defined by an axial alignment of the first component 18' with the second component 22' as best shown in FIG. 7. Once the first and second components 18' and 22' are in the aforementioned predetermined aligned relation to one another, forced positioning of these two components 18' and 22' towards one another as indicated by directional arrows 70 and 71 will cause the predetermined aligned engagement and the sliding contact of the leading surface segment 65 with the periphery of the receiving aperture 69. The size and configuration of the first and second components 18' and 22' of the preferred embodiment of the coupling assembly 16' allows the predetermined aligned engagement of the first and second component 18' and 22' by a single hand of the user to accomplish attachment of the first and second components 18' and 22' without the manipulation of the plunger 60.

As set forth above in order to accomplish a quick and efficient attachment of the components 18' and 22' to one another in the locked position of FIGS. 6 and 8, the first and second component 18' and 22' are disposed in a predetermined aligned engagement with one another. To further assist the aligned engagement, each of the embodiments of FIGS. 5 through 8 also preferably include an attraction assembly which facilitates such predetermined aligned engagement. Such an attraction assembly is mounted on the coupling assembly 16' in the form of correspondingly positioned, attractive, mating or engaging surfaces. With regard to the embodiment of FIG. 6, the annularly configured, exposed surface 72 is formed of a magnetic material and is positioned to attract a similarly constructed or formed annular surface 74 also formed of a magnetic material. In the locking position of FIG. 6 such surfaces will be normally brought into confronting engagement with one another. The provision of the magnetically attractive surfaces 72 and 74 and their relative disposition to one another will facilitate the axial alignment of the components 18' and 22' as well as the inwardly directed connecting force indicated by directional arrows 70 and 71 in order that the leading surface segments 65 of the locking fingers 62 will brought into direct engagement with the exposed, periphery of the receiving aperture 69, as set forth above.

In the embodiment of FIG. 6 the magnetically attractive surfaces 72 and 74 are substantially externally located when the first and second components 18' and 22' are separated from one another. Conversely the additional preferred embodiment of FIGS. 7 and 8 includes the magnetically attractive surfaces 78 and 80 disposed substantially interiorly but in the respective position of the first component 18' with the second component 22' as shown in FIG. 8.

In addition, the attraction assembly of the embodiment of FIGS. 7 and 8 may also include interior sides surfaces as at 82 which are designed to at least partially engage and cause the direct attraction of the locking fingers 62'. Accordingly, in the embodiment of FIG. 8 the locking fingers 62' are at least partially formed of a magnetically attractive material so as to facilitate the aforementioned predetermined aligned engagement for the components with one another.

Further with regard to FIG. 1, the present invention comprises an activation assembly generally indicated as 38. The activation assembly 38 is preferably, although not necessarily, integrated as part of a handle 40 structured to facilitate holding of the leash assembly during use. The handle 40 preferably includes a generally apertured construction 42 and further defines gripping means 43 dimensioned and configured to facilitate the holding or gripping of the handle 40 by a single hand of a user of the subject leash assembly. One feature of the present invention is the provision of an activation member as at 44 generally in the form of a spring biased push button, which, due to the force exerted thereon by a biasing spring (not shown for purposes of clarity) is preferably normally disposed in an outward position as shown. The activation assembly 44 is connected directly to a correspondingly positioned end of the release structure or release cable 24. The release cable 24, may be formed of a metallic material or other applicable materials. Regardless of the structural embodiments, release cable 24 should be sufficiently flexible to be rolled upon itself in a stored position or otherwise oriented as generally shown in FIG. 5, but should have sufficient structural integrity to be movable axially along its length, within the interior of the lead structure 10 and relative thereto. Such axial movement will be accomplished by an inward force being exerted by a finger of the user of the subject assembly on the activation member on push button 44 as indicated by directional arrow 45.

With reference to FIG. 4, another preferred embodiment of the present invention comprises basic structural features similar to the embodiment of FIG. 1 and with the exception that the elongated lead structure 10' has somewhat of a flat strap like configuration extending along its length. However, at least a portion of the lead 10' defines a hollow interior along the entire length thereof for the positioning and axial movement of the release structure or cable 24. Moreover, as illustrated in FIG. 2A, a sheath structure 27 may be disposed within the lead structure 10'.

The activation assembly 38' of the embodiment of FIG. 4 is associated with a handle structure 40' having a somewhat different configuration than that of the embodiment of FIG. 1. More specifically, the handle 40' comprises an open, central aperture construction 42' having a grip 43' designed to facilitate gripping by a hand of the user of the subject assembly. However, in this embodiment the activation assembly 38' comprises an activation member 44' in the form of a trigger type switch positionable for manipulation by a single finger of the gripping hand of the user of the subject assembly. The activation member 44' is normally biased into its outermost position, as shown in FIG. 4, by any type of biasing spring or the like. However, depression or movement of the activation member 44' to an inner position serves to axially move the elongated release structure or cable 24 within the lead 10'. Such axial movement will serve to disconnect the first component 18 of the coupling assembly 16 from the second component 22. More specifically, coupling assembly 28' is structured similar to coupling assembly 28 of FIG. 1 and includes releasable components 29' and 30'. Also, activation assembly 80', disclosed in FIG. 5 is similar in structure and operation to activation assembly 80 described in detailed with relation to the embodiment of FIG. 9.

An additional structural feature of the embodiment of FIG. 4 and in particular the actuation assembly 38' is the inclusion of a lock structure indicated as 50. The lock structure 50 may have any applicable or adequate structure secured to handle 40' so as to prevent the depression or inward travel of the actuation member 44'. This will prevent the inadvertent detachment of the coupling assembly 16 and eliminate the possibility of accidently releasing or detaching the animal from the elongated lead 10'.

Figure 3:
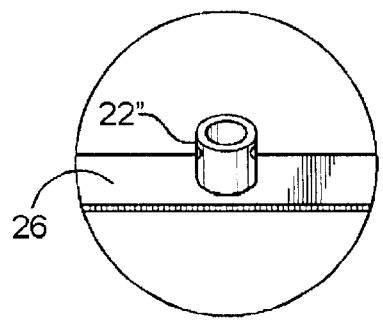
FIG. 3 is a detailed view showing another embodiment of the present invention.

With regard to FIG. 3, an alternate embodiment is disclosed wherein the second component indicated as 22" is fixedly mounted on an exterior surface 26 of the collar or animal mounted harness 26. The structural features of the second coupling component 22" is similar to that of the second component 22 of FIG. 1 in that it is designed to removably receive the first component 18 therein.

Figure 9:
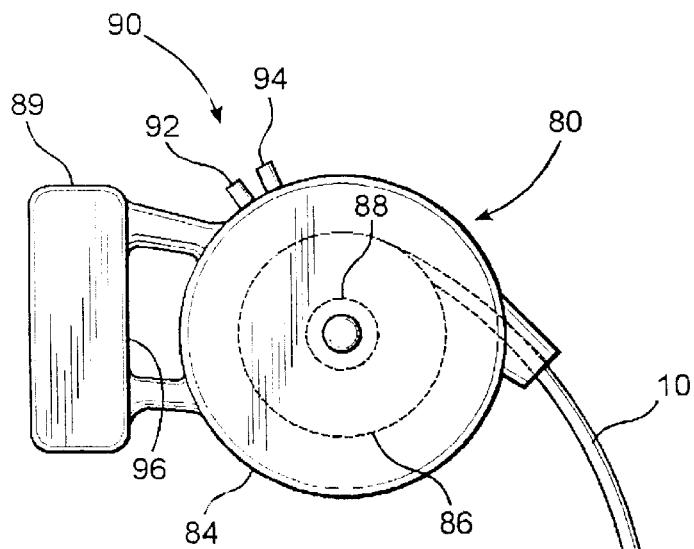
FIG. 9 is a side view of yet another preferred embodiment of an activation assembly associated with the leash assembly of the present invention.
Figure 10:
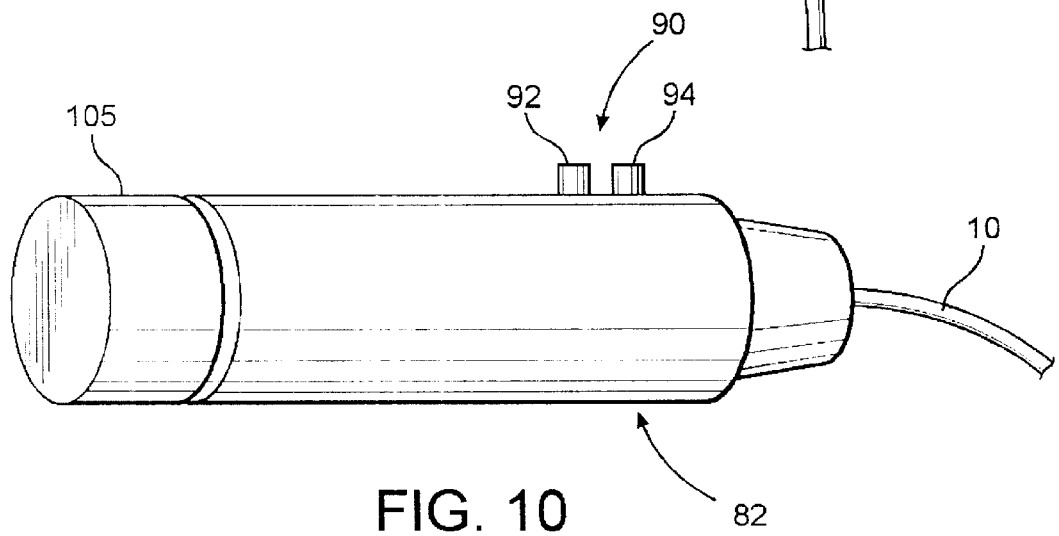
FIG. 10 is an external, perspective view of yet another embodiment of an activation assembly associated with the leash assembly of the present invention.
Figure 11:
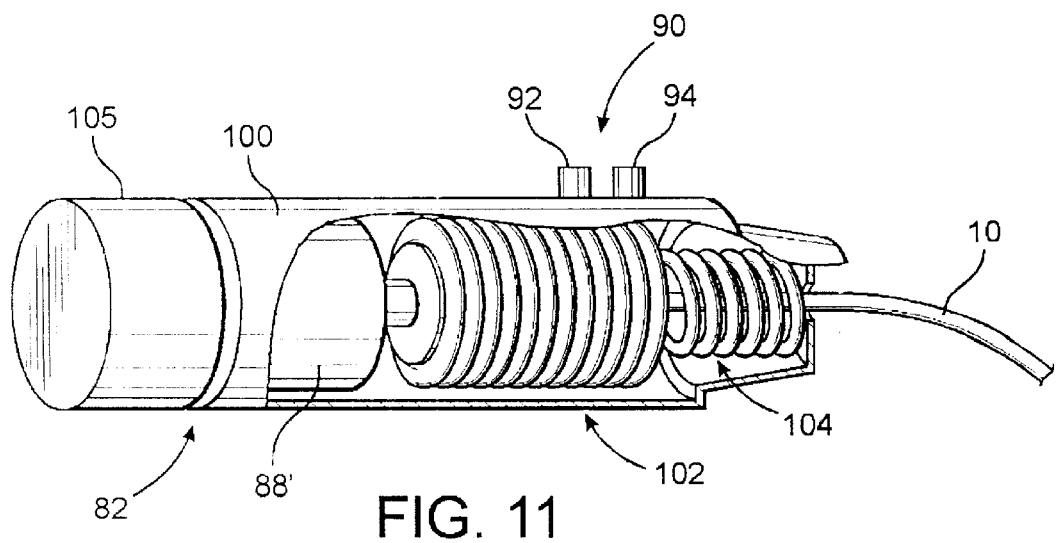
FIG. 11 is a perspective view showing interior structural details of the embodiment of FIG. 10.

Additional preferred embodiments of the present invention are shown in FIGS. 9, 10 and 11 and relate to an activation assembly generally indicated as 80 and 82, With regard to the embodiment of FIG. 9, the activation assembly 80 includes a housing 84 having an at least partially hollow interior for the mounting and enclosure of a storage or take-up spool indicated in phantom lines as 86. The take up spool 86 is rotationally mounted on the interior of the housing 84 and more specifically is operated by a drive motor schematically represented in phantom line as 88. The drive motor 88 is electrically powered and is specifically structured to be reversible so as to rotate the take-up spool 86 in opposite directions. This opposite direction of rotation of the drive motor 88 serve to either take-in or feed-out the elongated lead 10 thereby serving to completely control a tethered animal attached to the distal or free end of the elongated lead structure 10. By virtue of the "powered driving" mechanism comprising the drive motor 88, a user or handler of the subject lease assembly will be allowed to avoid the disadvantages associated with spring driven, retractable take up structures of the type typically found in conventional retractable leash assemblies. Further with regard to the embodiment of FIG. 9 the housing 84 includes a handle portion generally indicated as 89 which may be dimensioned and configured to have a hollow interior so as to house the electrical power supply used to energize the drive motor 88. Such power supply of course may be in the form of rechargeable direct current batteries or any other type of applicable power supply structured to supply sufficient power to operate the drive motor 88. Further, a switching assembly is generally indicated as 90, wherein one or more switches as at 92 may be used to operate the drive motor 88 and an additional one or two switches as at 94 are used to axially move the aforementioned release cable 24 so as to cause detachment or separation of components 18' and 22' of the coupling assembly 16'. It should also be noted that the overall configuration of the housing 84 could be such as to include an apertured configuration as at 96 which along with the dimension and configuration of the battery casing segment 89 may form a handle or grip to facilitate carrying or manipulation of the activation assembly 80.

With regard to the additional preferred embodiment of FIGS. 10 and 11, the activation assembly 82 comprises a housing as at 100 having a substantially hollow interior configuration for the mounting of a drive motor 88' and a storage or take up spool generally indicated as 102. The take up spool 102 may have a spiral configuration which stores the elongated lead 10 about the length of the take up spool 102 wherein a cushioning spring as at 104 is provided to cushion the movement of the elongated lead 10 into and out of the housing 100. Again, the drive motor 88' is structured to be reversible so as to selectively accomplish both the take-in and feed-out of the elongated lead 10 relative to take up or storage spool 102. A switching assembly generally indicates as at 90 is also mounted on the housing 100 in activating relation to the drive motor and to the elongated release structure in the form of release cable 24 as explained above. A separable casing segment 105 may be provided to enclose and secure a rechargeable battery therein, wherein the entire casing 105 and the battery mounted on the interior thereof may be removed from the remainder of the housing 100 for purposes of recharging or replacing.

Of course, however, in either of the powered embodiments, the drive motor may be configured to only manipulate the release cable 24, with the lead structure 10 itself being either of a fixed length or retractable. For example, in an embodiment with a long lead 10 or wherein the lead is substantially wound in a stored orientation, a greater force may be required to actuate the release cable 24.

As such, the drive motor could be used solely for the release cable 24. Additionally, whether the drive motor provides for powered movement of the lead and/or the release cable 24, a one way drive motor could also be effectively employed so long as an automatically or affirmatively releasing engagement with the retracted item is achieved. For example, if the lead is taken up by the drive motor a similar release as to that which is normally provided to release an inward spring bias can be employed to allow the lead to be let out without causing or requiring a reversal of the drive motor. Also, as to the release cable 24, only a momentary take up of the release cable 24 is required to detach the lead from the collar. As such, the drive motor could be configured to pull on the release cable a limited amount, after which it may automatically back or after which a normal bias on the release cable 24 can cause a clutch type release.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A leash assembly designed to provide both quick attachment and quick release of an animal therefrom, said assembly comprising:
    a) an elongated lead structure having a proximal end and an oppositely disposed distal end,
    b) a harness structured and configured for removable attachment to the animal,
    c) an elongated release structure movably mounted on said lead structure and extending along a length thereof; said release structure including a first end disposed adjacent said distal end and a second end disposed adjacent said proximal end,
    d) a coupling assembly including a first component connected to said first end of said release structure and a second component mounted on said harness,
    e) said first and second components cooperatively structured to assume a connected position when disposed in predetermined aligned engagement with one another and further structured and configured to be cooperatively manipulated into said predetermined aligned engagement by a single hand of a user,
    f) said first and second components further structured to be detached from one another upon disposition of said release structure into a disconnect position, and an activation assembly connected to said release structure adjacent to said proximal end of said lead structure,
    g) an activation assembly connected to said release structure adjacent said proximal end of said lead structure and structured to selectively dispose said release structure into an out of said disconnect position upon hand manipulation of said activation assembly, and
    h) said first component comprising two spaced apart locking fingers movably mounted thereon, each of said locking fingers including a leading surface portion and a trailing surface portion, each trailing surface portion defining a stop member and including a substantially linear configuration transversely oriented to corresponding ones said leading surface portions.

2. An assembly as recited in claim 1 wherein said locking fingers are normally biased into said locking orientation.

3. An assembly as recited in claim 1 wherein said release structure is operatively associated with said locking fingers so as to position said locking fingers into said retracted orientation upon actuation thereof into said disconnect position.

4. An assembly as recited in claim 1 wherein said first and second components each comprise an alignment structure formed thereon, each of said alignment structures being cooperatively disposed and structured to facilitate disposition of said first and second components into said predetermined aligned engagement.

5. An assembly as recited in claim 4 wherein each of said alignment structures comprises a magnetic surface disposed and structured to attract a correspondingly positioned magnetic surface on the other of said first and second components; said magnetic surfaces on each of said first and second components being cooperatively positioned to facilitate a predetermined aligned engagement of said first and second components.

6. An assembly as recited in claim 1 wherein said release structure comprises an elongated release cable having sufficient structural integrity to be axially moveable along the length of said lead structure and exert an axially directed force on said coupling assembly when disposed into and out of said disconnect position.

7. An assembly as in claim 6 wherein said activation assembly comprises an activation member connected to said second end of said release structure and moveable therewith, said activation member mounted adjacent said proximal end of said lead structure in an accessible position relative to a hand of a user thereof.

8. An assembly as recited in claim 7 wherein said release structure further comprising a sheath structure including a substantially hollow interior and structured to extend substantially along the length of said lead structure; said release cable mounted within said hollow interior of said sheath structure and extending along the length of said lead structure; said release cable axially moveable within said hollow interior of said sheath structure and positionable into an out of said disconnect position upon selective manipulation of said activation member.

9. An assembly as recited in claim 8 wherein both said lead structure and said release structure are formed of a material having sufficient flexibility to be disposed in a stored position at least partially defined by a substantially continuously rolled orientation.

10. An assembly as recited in claim 8 wherein said activation assembly further comprises a lock structure mounted on said handle and cooperatively disposed and structured relative to said activation member to selectively restrict movement of said activation member and prevent disposition of said release structure into said disconnect position.

11. An assembly as recited in claim 1 wherein said activation assembly comprises a housing dimensioned and configured to be held by a user thereof; said housing including a storage assembly movably mounted therein and disposed and structured to receive and support said lead structure and said release structure thereon in a stored position.

12. An assembly as in claim 11 wherein said storage assembly comprises a storage spool rotatably mounted within said housing and selectively operable to take-in and feed-out said lead structure and said release structure.

13. An assembly as recited in claim 12 wherein said storage assembly further comprises a drive motor mounted within said housing and connected in driving engagement with said release structure.

14. An assembly as recited in claim 13 wherein said drive motor is electrically powered and cooperatively structured and connected with said storage spool to rotate said storage spool in opposite directions, to accomplish take-in and feed-out of said lead structure and release structure.

15. An assembly as in claim 14 further comprising a portable power source removably mounted on said housing and electrically connected to said drive motor so as to deliver energizing current thereto.

16. An assembly as recited in claim 15 wherein said portable power source comprises a rechargeable direct current battery.

17. An assembly as recited in claim 1 wherein said leading surface portion of each of said locking fingers is disposed and configured to force said locking fingers into a retracted orientation upon sliding engagement with said second component.

18. An assembly as recited in claim 17 wherein said leading surface portion of each of said locking fingers comprises a substantially divergent, curvelinear configuration extending outwardly from said trailing surface portion.

19. An assembly as recited in claim 17 wherein said stop member is disposed and structured to maintain said locking finger in said outwardly extending orientation upon engagement with said second component.

20. A leash assembly designed to provide both quick attachment and quick release of an animal therefrom, said assembly comprising:

a) an elongated lead structure having a substantially hollow interior along its length and terminating at a proximal end and an oppositely disposed distal end, b) a harness including two connectable portions positionable in corresponding relation to one another to facilitate removable attachment of said harness to the animal, c) an elongated release structure mounted on said lead structure and axially moveable relative thereto into and out of a disconnect position, d) said release structure including a first end disposed adjacent said distal end and a second end disposed adjacent said proximal end, e) a first coupling assembly including a first component connected to said first end of said release structure and a second component mounted on said harness; said first and second component structured to be detached from one another upon disposition of said release structure into a disconnect position, f) a second coupling assembly including a first component and a second component each connected to a different one of said two connectable portions, g) said first and second components of both said first and second coupling assemblies cooperatively structured to assume a connected position when disposed in predetermined aligned engagement with one another, h) said first and second components of each of said first and second coupling assemblies being structured and configured to be cooperatively manipulated into said predetermined aligned engagement by a single hand of a user, i) an activation assembly connected to said release structure adjacent said proximal end of said lead structure and structured to selectively dispose said release structure into and out of said disconnect position upon hand manipulation of said activation assembly, and j) said first component of said first coupling assembly comprising two locking fingers each having a leading surface portion and a trailing surface portion; said trailing surface portion of each locking finger defining a stop member having a substantially linear configuration and being transversely oriented to corresponding ones of said leading surface portions.

21. An assembly as recited in claim 20 wherein said first component of said first coupling assembly comprises a body having at least one locking finger movably mounted thereon and positionable between an outwardly extending orientation and a retracted orientation; said one locking finger having an outer surface configuration disposable in sliding engagement with said second component when in said predetermined aligned engagement; said one locking finger disposed and configured for forced positioning into said retracted orientation and structured to be normally biased into locking engagement with said second component upon release of said forced positioning.

22. An assembly as recited in claim 21 wherein said first component of said first coupling assembly comprises at least two locking fingers disposed in spaced relation to one another, each of said locking fingers movably mounted and positionable between an outwardly extending orientation and a retracted orientation and disposed in engageable relation to said second component of said first coupling assembly; each of said two locking fingers having an outer surface configuration disposable in sliding engagement with a corresponding one of said second components when in said predetermined aligned engagement; each of said two locking fingers being disposed and configured for forced positioning into said retracted orientation and structured to be normally biased into locking engagement with said second component upon release of said forced positioning.

23. An assembly as recited in claim 22 wherein said release structure is operatively associated with said locking fingers so as to position said locking fingers into said retracted orientation upon actuation thereof into said disconnect position.

24. An assembly as recited in claim 23 wherein said outer surface configuration of each of said locking fingers includes a leading surface portion disposed and configured to force said locking finger into said retracted orientation upon sliding engagement with said second component.

25. An assembly as recited in claim 20 wherein said first and second components of said first coupling assembly comprises an alignment structure formed thereon, said alignment structure being cooperatively disposed and structured to facilitate disposition of said first and second components into said predetermined aligned engagement.

26. An assembly as recited in claim 25 wherein said alignment structure comprises a magnetic surface disposed and structured to attract a correspondingly positioned magnetic surface on the other of said first and second components of said first coupling assembly; said magnetic surfaces on each of said first and second components of said first coupling assembly being cooperatively positioned to facilitate said predetermined aligned engagement of said first and second components.

27. An assembly as recited in claim 20 wherein said leading surface portion of each of said locking fingers is disposed and configured to force said locking finger into a retracted orientation upon sliding engagement with said second component.

28. An assembly as recited in claim 27 wherein each of said stop members is disposed and structured to maintain said locking fingers in an outwardly extending orientation upon engagement of said stop member with said second component.

29. A leash assembly designed to provide both quick attachment and quick release of an animal therefrom, said assembly comprising:
  a) an elongated lead structure having a proximal end and an oppositely disposed distal end,
  b) a harness structured and configured for removable attachment to the animal,
  c) an elongated release structure movably mounted on said lead structure and extending along a length thereof; said release structure including a first end disposed adjacent said distal end and a second end disposed adjacent said proximal end,
  d) a coupling assembly including a first component connected to said first end of said release structure and a second component mounted on said harness,
  e) said first and second components cooperatively structured to assume a connected position when dispose in predetermined aligned engagement with one another,
  f) said first component comprising at least two spaced apart locking fingers movably mounted thereon and disposable into an out of a retracted orientation; each of said locking fingers including a leading surface portion and a trailing surface portion, each of said trailing surface portions defining a stop member including a substantially linear configuration transversely oriented to corresponding ones of said leading surface portions, and
  g) said first and second components further structured to be detached from another upon disposition of said release structure into a disconnect position and disposition of said locking fingers into said retracted orientation.

* * * * *